United States Patent
Cayla

(10) Patent No.: US 7,400,584 B2
(45) Date of Patent: Jul. 15, 2008

(54) METHOD OF CONTROLLING TRANSMISSION OF DATA AND A CONTROL UNIT FOR IMPLEMENTING THE METHOD

(75) Inventor: Stéphane Cayla, Viroflay (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 761 days.

(21) Appl. No.: 10/455,911

(22) Filed: Jun. 6, 2003

(65) Prior Publication Data

US 2004/0042452 A1 Mar. 4, 2004

(30) Foreign Application Priority Data

Jun. 14, 2002 (FR) ................................ 02 07371

(51) Int. Cl.
*H04L 12/54* (2006.01)
(52) U.S. Cl. .................. 370/235; 370/428; 370/253
(58) Field of Classification Search ................. 370/428, 370/235, 253
See application file for complete search history.

(56) References Cited

U.S. PATENT DOCUMENTS

| 7,012,905 B2 * | 3/2006 | Haumont et al. ............ 370/331 |
| 7,099,273 B2 * | 8/2006 | Ha et al. ..................... 370/229 |
| 2002/0081971 A1 * | 6/2002 | Travostino ................... 455/41 |
| 2002/0191627 A1 * | 12/2002 | Subbiah et al. ............. 370/428 |
| 2002/0196752 A1 * | 12/2002 | Attar et al. .................. 370/331 |
| 2003/0035407 A1 * | 2/2003 | Govindarajan et al. ...... 370/349 |
| 2003/0202480 A1 * | 10/2003 | Swami ........................ 370/252 |

FOREIGN PATENT DOCUMENTS

WO WO 00 79808 12/2000
WO WO 01 33762 5/2001

OTHER PUBLICATIONS

Request for comments (RFC) 2581 published by IETF in Apr. 1999.

(Continued)

*Primary Examiner*—Ricky Q. Ngo
*Assistant Examiner*—Ankit P Gandhi
(74) *Attorney, Agent, or Firm*—Trop, Pruner & Hu, P.C.

(57) ABSTRACT

A cellular mobile radio network includes base stations, a packet control unit capable of communicating with a radio terminal via two or more base stations, and routing means for routing data between a remote unit and the packet control unit. The data transmitted by the remote unit to the terminal are stored temporarily in the packet control unit. The remote unit is adapted to receive from the terminal acknowledgments relating to transmitted data segments and to retransmit data segments that have not been acknowledged on the expiry of a retransmission time depending on the received acknowledgments. Data segments are transmitted from the remote unit to the terminal via a first base station connected to the packet control unit. In response to a request for communication transfer to a second base station connected to the packet control unit, only a portion of the data stored temporarily in the packet control unit is retransmitted to the terminal via the second base station.

18 Claims, 4 Drawing Sheets

OTHER PUBLICATIONS

Request for comments (RFC) 2988 published by IETF in Nov. 2000.
Technical Specification TS 08.18, version 8.7.0, published by the 3GPP in Apr. 2001.
GSM Technical Specification 03.60 version 7.3.1 published in Sep. 2000 by the ETSI.
ETSI technical specification TS 101 350, Digital cellular telecommunications system (Phase 2+) ; General Packet Radio Service ( GPRS) ; Overall description of the GPRS radio interface ; Stage 2 (3GPP TS 03.64, version 8.10.0, Release 1999).
EN 301 349, Digital cellular telecommunications system (Phase 2+); General Packet Radio Service (GPRS); Mobile Station (MS)—Base Station (BSS) interface; Radio Link Control/Medium Access Control (RLC/MAC) protocol (GSM 04.60, version 8.4.1, Release 1999) published by the ETSI in Oct. 2000.
ETSI technical specification TS 101 347, Digital cellular telecommunications system (Phase 2+); General Packet Radio Service (GPRS); GPRS Tunneling Protocol (GTP) across the Gn and Gp interface (3GPP TS 09.60, version 7.8.0, Release 1998), published by the ETSI in Sep. 2001.
GSM Technical Specification 03.22, version 8.3.0, published in Apr. 2000 by the ETSI. Digital cellular telecommunications system (Phase 2+); Functions related to Mobile Station (MS) in idle mode and group receive mode (GSM 03.22 version 8.3.0 Release 1999).

* cited by examiner

METHOD OF CONTROLLING TRANSMISSION OF DATA AND A CONTROL UNIT FOR IMPLEMENTING THE METHOD

BACKGROUND OF THE INVENTION

The present invention relates to techniques for controlling data transmission along communication paths that include a radio part provided by a cellular mobile radio network.

The invention finds a particular, although not exclusive, application in implementing the Transmission Control Protocol (TCP) standardized by the Internet Engineering Task Force (IETF) and used in many telecommunication systems using the Internet Protocol (IP) in the network layer. The TCP uses a data acknowledgment and retransmission mechanism. Requests For Comments (RFC) 2581 and 2988 published by the IETF in April 1999 and November 2000, respectively, specify ways of retransmitting data in a system using the TCP in the transport layer.

According to RFC 2988, a first TCP host (e.g. a server) that is seeking to transmit data to a second TCP host (e.g. a fixed terminal) negotiates with the latter the size of the segments (TCP data units) that they may exchange. The maximum size of a TCP segment is 1500 bytes, but a segment can be smaller, especially if one of the hosts supports only more limited segment sizes.

The first TCP host then evaluates a round trip time (RTT) for the data, corresponding to the time between the transmission of a set of data segments and the reception by the server of an acknowledgment message sent by the terminal in response to the reception of these data segments. It must be noted that there is no one-to-one correspondence between the TCP data segments and the acknowledgments, which means that the terminal can send an acknowledgment in response to receiving a plurality of data segments transmitted by the server. The data is identified by means of a mechanism for numbering the bytes exchanged, whereby each segment transmitted from the server to the terminal contains a 32-bit sequence number corresponding to the number of the first byte carried by the segment transmitted, and each acknowledgment contains the next sequence number that the terminal is expecting to receive from the server, i.e. the sequence number obtained by adding 1 to the sequence number of the last byte that was received successfully.

The server also evaluates, for each new calculated value of the RTT, a smoothed round-trip time (SRTT) parameter that is a function of the RTT. The SRTT typically takes relatively less account of the new calculated value of the RTT and relatively more account of the previously calculated value of the SRTT.

Finally, a retransmit time out (RTO) parameter is evaluated by the server. It is used to control the time between sending a data set and retransmitting that set when the server receives no acknowledgment corresponding to these data from the terminal. The RTO is directly dependent on the average value and the variance of the SRTT parameter, so that its value increases if the RTT is subject to significant variations. This prevents precipitate retransmission of data that may in fact have been received by the terminal. When retransmission has been effected, upon expiry of the RTO, the server can increase the RTO, for example double it, to prevent successive retransmissions that are too closely spaced in time.

The above kind of process is well suited to transmitting data between fixed TCP hosts, as the data routing times are generally relatively stable. Any variations in the RTT, for example in the event of congestion, are accompanied by small variations in the RTO, and acknowledgments can therefore usually be received before the data concerned is retransmitted.

Consider now data transmission in a mobile context, for example between a data server and a radio terminal via a radiocommunication network. Transmission of data via a General Packet Radio Service (GPRS) network as defined by the European Telecommunications Standards Institute (ETSI) is known in the art. The radio terminal and the remote TCP host (e.g. a server) include, as in the previous situation, a TCP protocol layer to perform data transport. In this situation, the mobile radio network relays TCP segments between the terminal and the server without interpreting them.

In such system, the radio terminal is linked by radio to a base station connected to the data server via a packet control unit (PCU) and switches called GPRS serving nodes (GSN) that are specific to the GPRS core network.

Given the mobility of the terminal, it may be determined, for example after an analysis of radio propagation condition measurements, that it is necessary to switch the communication to a second base station. The terminal then advises the GPRS network of this fact. This mechanism is called cell reselection.

However, until it receives the cell reselection information from the terminal, the network does not know that the terminal is no longer accessible from the first base station, and so continues to transmit data to the terminal on the path via the first station. Because the terminal is then no longer in a position to acknowledge data sent by the server, the latter retransmits the data that has not been acknowledged each time the RTO expires, and increases the RTO for the next retransmission.

Because the network takes account of the mobility of the terminal after a time period of typically 15 seconds, the RTO may have increased considerably in the meantime. Then, once the radio link has been set up between the second base station and the radio terminal, the non-acknowledged segments are retransmitted by the server upon expiry of the RTO, before being eventually forwarded to the terminal and, if all goes well, acknowledged by the terminal. In this case, the mobility of the terminal therefore has the effect of introducing potentially very long periods in which transmission of data is interrupted, which represents a heavy penalty for the user of the terminal, especially if the current service necessitates a high and relatively constant bit rate.

The data transmitted by the server are temporarily stored in the form of GPRS packets in buffers of the PCU before retransmission to the radio terminal. In the most usual situation, the control unit empties its buffers before transmission is resumed via the second base station.

However, the Third Generation Partnership Project (3GPP) organization, responsible for standardizing the so-called 3rd generation systems, provides for the network optionally to command transfer to the second base station of all data in the buffers of the PCU addressed to the terminal, provided that the second base station is controlled by the same PCU as the first base station.

This procedure called FLUSH-LL is described in section 8.1 of the technical specification TS 08.18, version 8.7.0, published by the 3GPP in April 2001. It relies on the transmission of a FLUSH-LLC PDU packet from the GPRS core network to the PCU after the terminal reports cell reselection. This packet contains a terminal identifier called temporary logical link identity (TLLI). It also contains BSSGP virtual connection identifier (BVCI) parameters for identifying the first and second base stations. On receiving this message, the PCU is able to find all of the data stored in its buffers addressed to a terminal via the first base station and transfer the data to the second base station. The latter finally relays the data to the radio terminal, in the form of frames, as soon as the associated radio link is set up, and thus the terminal may acknowledge the data as soon as the frames are received and recombined to restore the TCP segments transmitted.

This circumvents the waiting time for the next retransmission (which can be very long at this stage of the process) before starting to acknowledge the data previously transmitted. However, given the time needed for the network to update the radio link, the PCU buffers generally contain a large amount of data for the attention of the terminal. The packets further include data from different TCP segments, including retransmission of some segments that have not been acknowledged, sent by the server each time the RTO expires. Accordingly, although there is a time saving for this option compared to the conventional mode of operation, the data transmission is nevertheless subject to lengthy interruption, related in particular to the time to transfer to the radio interface all the packets contained in the buffers of the PCU and addressed to the terminal, some of which are redundant.

An object of the present invention is to reduce the waiting time before resuming the transmission of data. Another object of the invention is to avoid congestion of the radio channel due to redundant and unnecessary transmissions.

SUMMARY OF THE INVENTION

The invention proposes a method of controlling data transmission from a remote unit to a radio terminal via a cellular radiocommunication network including base stations, a packet control unit capable of communicating with the terminal via at least two of the base stations, and routing means for routing data between the remote unit and the packet control unit, wherein at least some of the data transmitted by the remote unit to the terminal are stored temporarily in the packet control unit, wherein the remote unit is arranged to receive from the terminal acknowledgments relating to transmitted data segments and to retransmit data segments that have not been acknowledged on the expiry of a retransmission time depending on the received acknowledgments. According to the invention, the method comprises the steps of:

transmitting data segments from the remote unit to the terminal via a first base station connected to the packet control unit; and in response to a request for communication transfer to a second base station connected to the packet control unit, retransmitting only a portion of the data stored temporarily in the packet control unit to the terminal via the second base station.

Retransmitting to the radio terminal some of the stored data, which may amount to a single data segment, for example the first one transmitted by the remote unit and not acknowledged by the terminal, has the advantage of restarting transmission quickly and preventing an excessive increase in the TCP parameters (RTT, RTO) referred to in the introduction.

In another aspect, the present invention provides a packet control unit for a cellular communication network, comprising interface means with a switch of the cellular network and means for communicating with a radio terminal via at least first and second base stations. The interface means with the switch include storage means for storing temporarily data frames carrying data segments from a remote unit. The means for communicating with the terminal include means for transmitting data frames in the form of data blocks in an acknowledged mode. The storage means are arranged to retain each data frame in memory as long as all of the data of the frame has not been acknowledged by the terminal. The packet control unit further comprises retransmission means for, in response to a request for communication transfer from the first base station to the second base station, retransmitting to the terminal via the second base station at least one data block corresponding to only a portion of the data frames that are stored temporarily and were transmitted via the first base station.

BRIEF DESCRIPTION THE DRAWINGS

DESCRIPTION OF PREFERRED EMBODIMENTS

The remainder of the description relates to the non-limiting application of the invention to a GPRS system.

Figure 1:
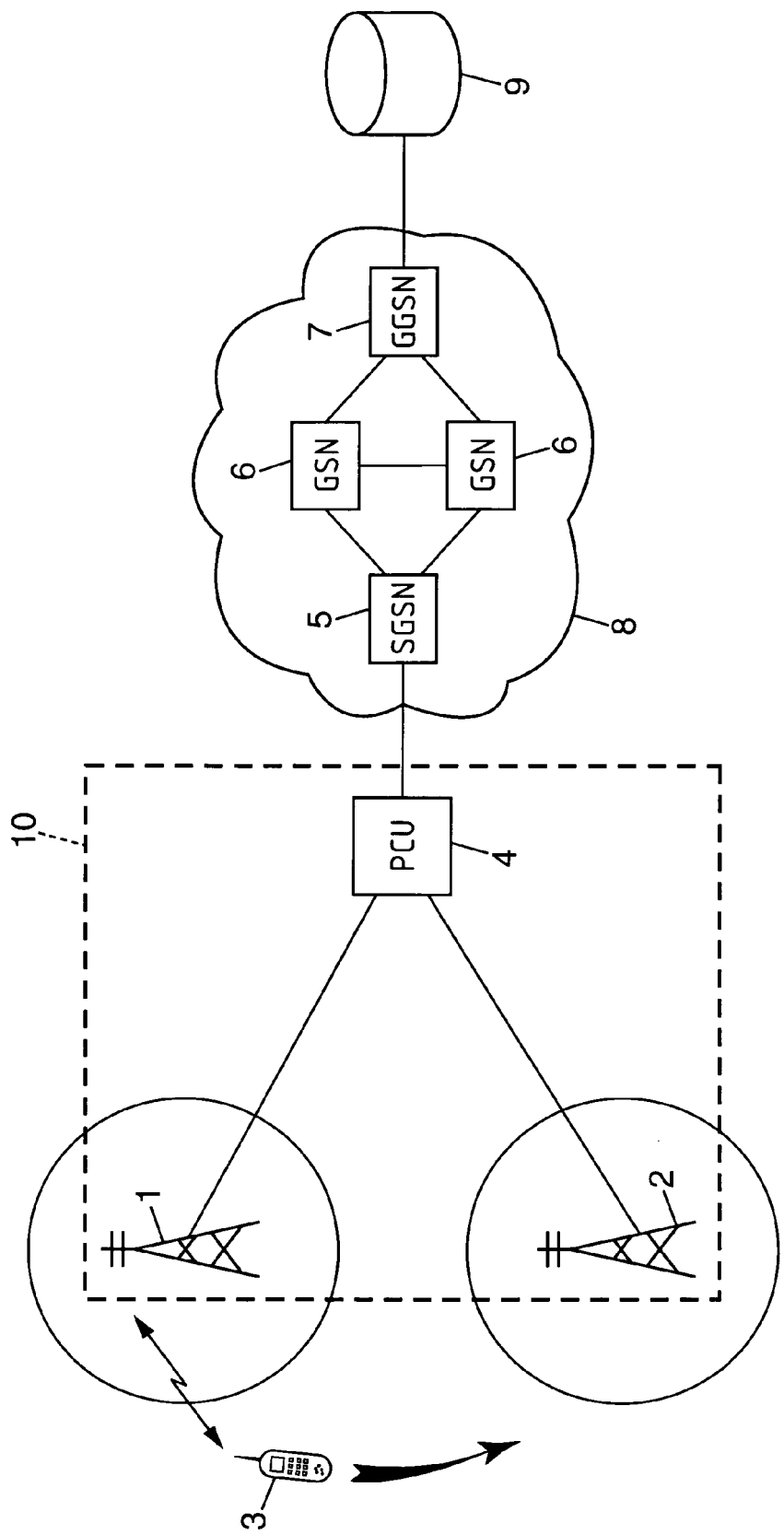
FIG. 1 is a diagram of a system implementing the invention in its application to a GPRS network.

FIG. 1 shows two units 3, 9 communicating with each other using the TCP/IP protocol. Without this being restrictive on the invention, in the remainder of the description these two units are respectively a radio terminal 3 and a data server 9.

The radio terminal is adapted to communicate with an access sub-system 10 of a cellular mobile radio network, the access sub-system including base stations 1, 2 distributed over the coverage area of the network, base station controllers (BSC), not shown in the figure, and packet control units (PCU) 4.

The server 9 is connected directly or indirectly to a network sub-system (or core network) 8 of the cellular network so that it can exchange data with the radio terminal 3. The sub-system 8 comprises a set of meshed data switches 5-7 called GPRS support nodes (GSN).

The switch to which the PCU 4 serving a given terminal 3 is connected is called a serving GSN (SGSN). The SGSN 5 provides GPRS access for the terminal. It is responsible in particular for managing the mobility of terminals in its coverage area, i.e., in this example, it maintains a knowledge of the current base station for the terminal 3.

Figure 1A:
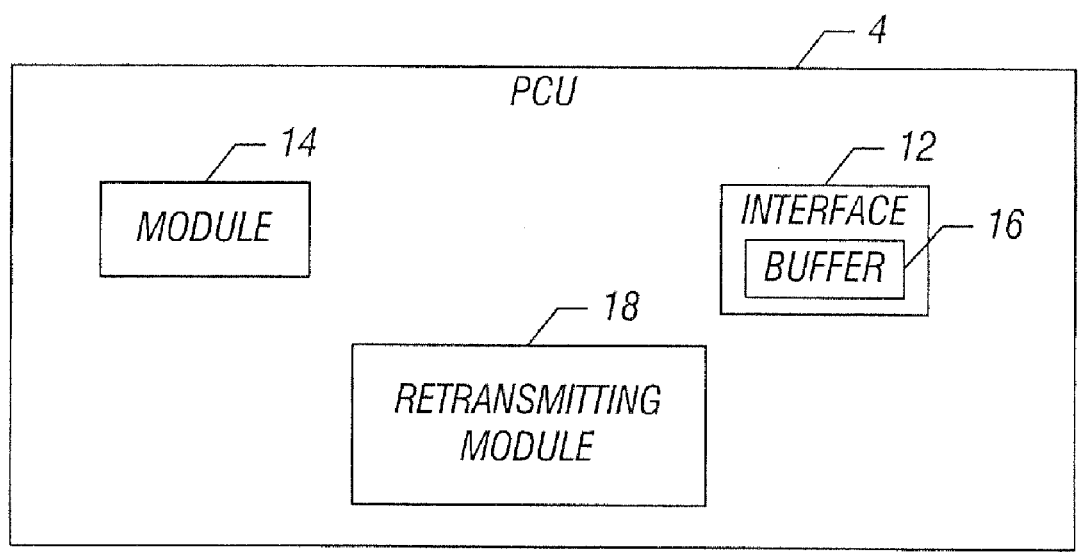
FIG. 1A is a block diagram of a packet control unit (PCU).

As depicted in FIG. 1A, the PCU 4 includes an interface 12 to be coupled to the SGSN 5, and a module 14 to communicate with the terminal 3 through base stations 1, 2. The interface 12 also includes one or more buffers 16 to temporarily store data frames.

The sub-system 8 also includes a gateway GSN (GGSN) 7 to which the data server 9 is connected, for example via an external data network such as the Internet (not shown in FIG. 1) or an Intranet. In the IP layer implemented in the radio terminal 3 and the server 9, this GGSN 7 constitutes the router nearest the terminal 3. The sub-system 8, which is essentially made up of data switches, thus serves to route data from the server 9 to the PCU 4.

In functional terms, the PCU 4 belongs to the access sub-system 10, although in some architectures it is co-located with the SGSN 5. The FIG. 1 mobile radio network includes two base stations 1, 2 which are both connected to the same PCU 4.

The PCU 4 transmits data received from the SGSN 5 to the base station 1 with which the radio terminal 3 is communicating. Similarly, the radio terminal 3 can send data to the server 9. To this end, it transmits the data to the base station 1, which communicates it to the PCU 4, which in turn transmits it to the SGSN 5. The data is then routed through the sub-system 8 to the GGSN 7 and finally reaches the server 9.

Figure 2:
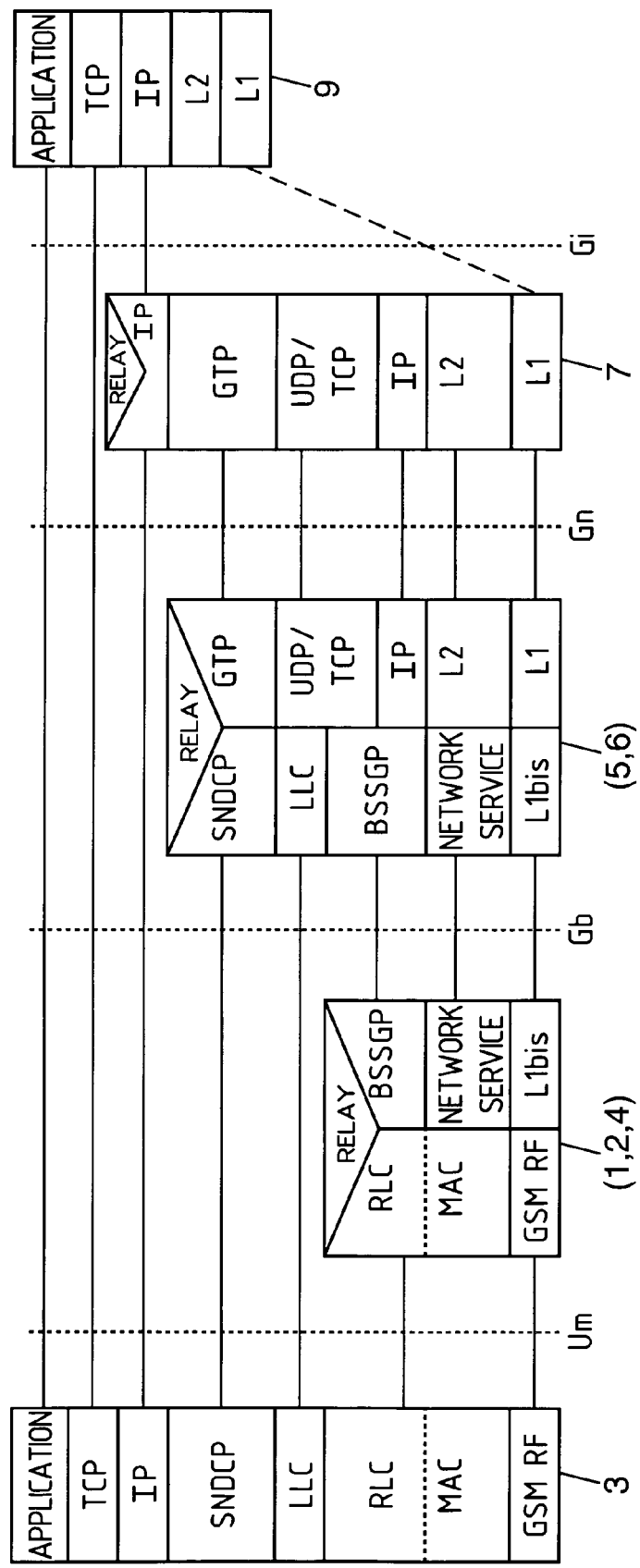
FIG. 2 is a representation of protocol layers in the FIG. 1 system used by the invention.

Numerous protocols are involved in the transmission of data between the terminal 3 and the server 9, although only a limited number of them are relevant to the present invention and therefore more specifically referred hereinafter. They are shown in FIG. 2 and are described in GSM Technical Specification 03.60 version 7.4.1 published in September 2000 by the ETSI.

Exchanges between the terminal 3 and a base station, such as the base station 1 in this example, are effected via a radio interface called Um, a detailed description of whose operation can be found in the ETSI technical specification TS 101 350, Digital cellular telecommunications system (Phase 2+); General Packet Radio Service (GPRS); Overall description of the GPRS radio interface; State 2 (3GPP TS 03.64, version 8.10.0, Release 1999), published in February 2002 by the ETSI. The OSI layer 2 protocols used at this interface are the radio link control/medium access control (RLC/MAC) protocols described in the ETSI European Standard EN 301 349, Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60, version 8.4.1, Release 1999) published by the ETSI in October 2000.

The data are then converted in the radio network and the PCU 4 so as to be transmitted to the SGSN 5 via the interface Gb, which is an asynchronous interface based on the frame relay (FR) protocol and a BSS GPRS protocol (BSSGP) that transports routing and quality of service data between the BSS and the SGSN.

The SGSN 5 converts the data into a format better suited to Internet type data transmission systems. A GPRS tunneling protocol (GTP) is also used to transmit data in the form of packets between the GSN 5-7 via the interface called Gn, described in the ETSI technical specification TS 101 347, Digital cellular telecommunications system (Phase 2+); General Packet Radio Service (GPRS); GPRS Tunneling Protocol (GTP) across the Gn and Gp interface (3GPP TS 09.60, version 7.8.0, Release 1998), published by the ETSI in October 2001.

Finally, data is exchanged between the GGSN 7 and the server 9 via the interface Gi using the well-known Internet Protocol (IP).

In a typical embodiment of the invention, the radio terminal 3 and the data server 9 share a TCP transport layer, as referred to in the introduction, capable of controlling the transmission of data by offering processes for acknowledging transmitted data and retransmitting data that has not been acknowledged.

As shown in FIG. 2, the TCP data segments are muted between the terminal 3 and the server 9 using relay mechanisms available at various levels in the various protocol layers and in the various entities of the network (1,2,4, 5, 6, 7), as explained above. Above the TCP layer, the terminal 3 and the server 9 have access to application layers corresponding to the service that the user of the terminal 3 wishes to access. When the server 9 must transmit TCP segments to the terminal 3, they are routed within the sub-network 8 and then to the PCU 4 in the manner previously described.

The PCU 4 has buffers 16 capable of temporarily storing data transmitted to it by the SGSN 5, following segmentation by the SGSN 5 of data received from the server 9. The segmentation produces logical link control (LLC) frames. The PCU 4 then transmits the data that it has received for the terminal 3 to the base station 1 that is communicating with the terminal, in the form of RLC/MAC blocks that are transmitted in radio frames. The buffers referred to here advantageously store temporarily the data contained in the LLC frames transmitted by the SGSN 5, which data therefore remains in the buffers of the PCU 4 until all the RLC/MAC blocks resulting from the segmentation of the LLC frames have been acknowledged. Other buffers can be provided in the PCU for temporarily storing RLC/MAC blocks not acknowledged by the terminal and for repeating them in the event of deterioration of the radio channel or losses on the radio channel.

The base station 1 is responsible for transferring the data to the terminal 3 in the form of radio frames. Once the terminal has received the data, it reassembles the data to reconstitute the RLC/MAC blocks, which it then acknowledges in layer 2. Layer 2 also reassembles the LLC frames. The LLC protocol uses the LLC frames to reconstitute IP datagrams, which finally enable the terminal to find the segmented format specific to the TCP transport layer. It then acknowledges reception of the segments by sending the server 9 an acknowledgment message containing a sequence number identifying the acknowledged data. In this way each data segment received at the terminal 3 can be acknowledged.

In another embodiment, before the transmission of data begins, the server 9 and the terminal 3 negotiate a maximum number of data segments to be acknowledged simultaneously. In this case, the terminal 3 can either acknowledge each segment separately or choose to acknowledge a number of successive segments received within a limit set by the negotiated maximum number.

In the context of cell reselection, the radio terminal 3 can request a communication transfer to another base station, such as the base station 2, after analyzing radio measurements obtained from beacon signals transmitted by base stations near the current cell. The purpose of this analysis, which is known in the art, is to identify the cell producing the best received signal level at the terminal. In a conventional GPRS implementation, communication transfer from a cell covered by one base station to another cell is controlled entirely by the radio terminal itself. Therefore, the SGSN 5 is not involved in the decision to transfer cells.

The above cell selection procedure is described in particular in section 4.5 of GSM Technical Specification 03.22, version 8.3.0, published in April 2000 by the ETSI. Once the radio terminal 3 has identified a base station 2 offering a radio link with better propagation conditions than those offered by the base station 1, the radio terminal 3 conventionally transmits a layer 3 (LLC) frame, which can be empty, to the SGSN 5. This control frame contains a TLLI characteristic of the terminal 3.

In the example shown in FIG. 1, the location area in which a TLLI value is associated with the terminal 3 contains the cells served by the base stations 1 and 2, and the TLLI used for the radio terminal 3 is therefore the same for exchanges between the terminal and the SGSN 5, regardless of the base station with which the terminal is communicating. Because the LLC frame is transmitted by the terminal 3 via the base station 2, the SGSN 5 is able to update the base station to which the terminal 3 is connected in a location table, the terminal being identified by the TLLI inserted into the LLC frame.

Before the radio terminal 3 transmits the LLC frame to the SGSN 5, the latter does not know the new location of the radio terminal 3, and therefore considers the latter to be still connected to the base station 1. Thus any data segment addressed to the terminal 3 in a transmission from the data server 9 is routed to the base station 1 by the SGSN 5 and then by the PCU 4. Because the terminal 3 has cleared down its radio link with the base station 1, without informing the latter, it is no longer in a position to receive data frames from the base station 1. Thus the terminal 3 does not acknowledge any of the RLC/MAC blocks transmitted, and the PCU 4 interprets this as a lost communication. In this period, the TCP layer of the server 9 increases its parameter RTO for communicating with the terminal 3, as explained in the introduction.

When the LLC frame for updating the location of the terminal 3 has been transmitted to the SGSN 5, the latter is in a position to set up a communication link with the terminal 3 via the base station 2. Thus new data received from the server 9 and addressed to the terminal 3 can be routed to the terminal 3 via the PCU 4 and the base station 2.

According to the invention, when the SGSN 5 has received from the terminal 3 a message updating its current base station, it commands the PCU 4, whose buffer memories contain data that have not been received by the terminal 3 during cell reselection, to transfer to the base station 2 only a portion of the stored data. The base station 2 then transmits the data to the terminal 3 on behalf of the PCU 4. The SGSN 5 can command the transfer of a portion of the data stored by the PCU 4 by sending a FLUSH-LLC packet to the PCU 4, as previously explained. The PCU 4 interprets the packet in such a way that that it transfers a portion of the data to the base station 2.

In another embodiment, for example with the PCU 4 and the SGSN 5 co-located within the same equipment, partial transfer of data can be commanded as a result of signaling specific to the equipment concerned.

The data stored in the buffers of the PCU 4 comprise useful data and the same data retransmitted by the data server 9 on each expiry of its RTO counter. For the PCU 4 to send the terminal 3 all the data temporarily stored in its buffers would be counterproductive for various reasons:

- it could cause congestion of the radio channel between the base station 2 and the terminal 3 by using it to retransmit the same set of data several times,
- it could prompt the terminal 3 to acknowledge identical data several times, and
- depending on the quantity of information transmitted, it might not necessarily prevent other transmissions of the same data by the server 9 in the TCP layer, since each acknowledgment transmitted by the terminal 3 may result in the server 9 resuming transmission of non-acknowledged data.

According to the invention, only a portion of the data stored temporarily in the buffers of the PCU 4 is therefore communicated to the base station, in order to be relayed to the terminal 3.

In a typical implementation, the data retransmitted by the PCU 4 can substantially correspond to a data segment (i.e. to the LLC frames derived from the same TCP segment). To this end, the PCU 4 sends from its buffers a number of bytes substantially corresponding to the size of a TCP segment, if it knows this. If not, it can send 1500 bytes, corresponding to the maximum size of a segment. It can advantageously send up to 3000 bytes of data contained in its buffers, to guarantee the transmission of at least one complete segment.

This segment is preferably the first segment that has not yet been acknowledged by the radio terminal. This is possible in particular if the size of the buffers of the PCU 4 is such that a sufficient quantity of data can be stored. To guarantee a sufficient size of the PCU buffers in a large number of situations, an operator having control over the parameter settings of the TCP hosts, i.e. the server 9 and the terminal 3, can advantageously set the maximum quantity of data that the server 9 can transmit to the terminal 3 without waiting for an acknowledgment to be sent back to a value much lower than the size of the buffers of the PCU 4.

In this situation, the terminal can acknowledge a segment received by sending an acknowledgment message to the server 9. On receiving the acknowledgment, the server 9 calculates a new value of RTT for the current TCP connection with the terminal 3 and updates its RTO counter as a function of the calculated RTT value, as explained in the introduction.

The effect of the server 9 receiving the acknowledgment from the terminal 3 of the first segment not previously acknowledged is to resume transmission, starting from the acknowledged data, i.e. starting from the segment whose first byte has the sequence number supplied by the terminal in its acknowledgment. This prevents the user of the terminal 3 having to suffer an excessively long interruption in service during the data transfer he is executing. Moreover, the resumption of transmission by the server 9 is accompanied by recalculation of the RTO, which interrupts the process of regularly increasing the value of this counter, as explained in the introduction. If, as a result of this, data segments are not acknowledged by the terminal 3, they can be retransmitted within a reasonable time delay without excessive impact on communication quality.

In another embodiment the radio terminal acknowledges an integer number of data segments greater than 1. On receiving an acknowledgment from the terminal, the data server 9 then repeats all of the data segments that it has transmitted to the radio terminal 3 that the latter has not acknowledged.

Figure 4:
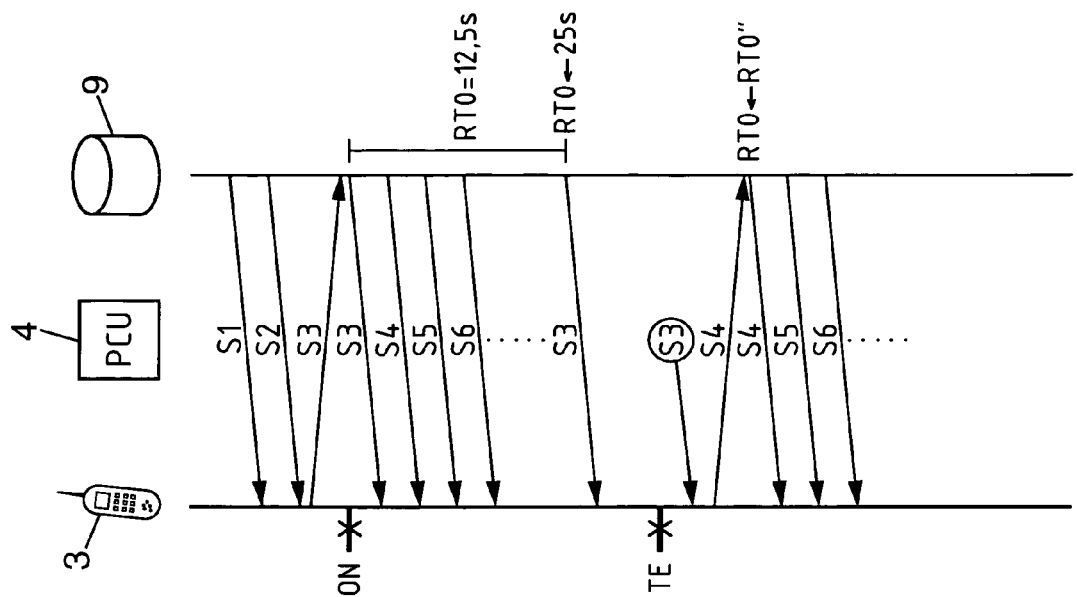
FIG. 4 is a timing diagram of the same example of transmission using one embodiment of a mobility procedure in accordance with the invention.
Figure 3:
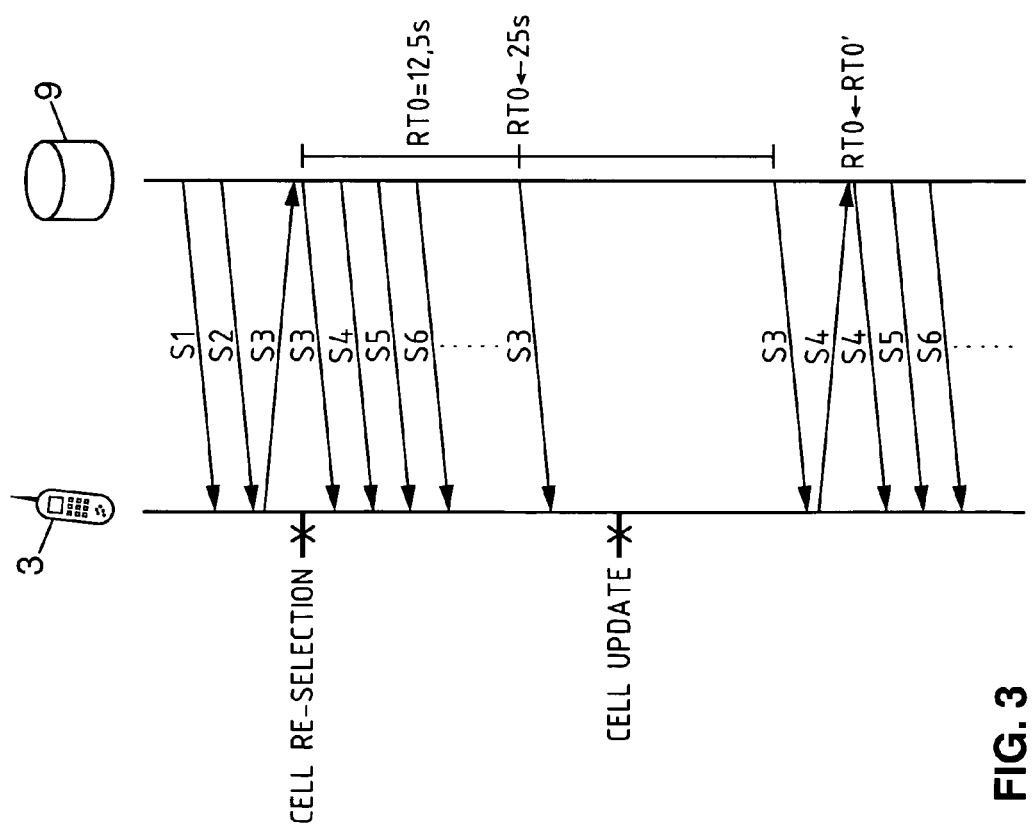
FIG. 3 is a timing diagram of a simplified example of transmission during a prior art mobility procedure.

FIGS. 3 and 4 give an idea of the time that can be saved by using the invention (FIG. 4) compared to using a conventional TCP mechanism (FIG. 3) during a GPRS cell reselection procedure.

In these diagrams, the server 9 sends segments S1, S2, . . . , S6 to the terminal 3, which acknowledges the first two segments received by means of an uplink message inserting the sequence number of the next segment (S3) it is expecting to receive. It then starts the cell reselection procedure previously described. The subsequent segments S3 to S6 are therefore no longer acknowledged and the server 9 begins to increase the RTO for its connection with the terminal 3, previously set to 12.5 seconds in the present example. Accordingly, after 12.5 s the server retransmits the segment S3 and doubles the RTO to 25 s. The terminal 3 informs the network of the cell from which its communication will continue, using the update procedure previously described. Behavior differs from this point on according to the mode of operation chosen.

In the conventional TCP mechanism shown in FIG. 3, which is not very suitable in the context of GPRS cell reselection, the server waits for the 25 s of the RTO to expire before retransmitting the segment S3. On receiving the segment S3, the terminal 3 acknowledges it, the effect of which is to allow transmission to resume. On receiving the acknowledgment of the segment S3, the server 9 calculates a new value of RTO, which takes into accont the round-trip time RTT between the first sending of the segment S3 and its acknowledgment (i.e. a RTT slightly greater than 12.5+25=37.5 s).

Note that a later cell change notification by the terminal 3 could lead to the RTO being doubled again to 50 s. After that, any segment transmitted and not received at the terminal 3 would not be retransmitted by the server 9 for a very long time, representing a penalty on the transfer in progress.

In an embodiment of the invention, the segment S3 is retransmitted by a retransmitting module 18 (FIG. 1A) in the PCU 4 immediately after the cell change notification by the terminal 3. The latter then acknowledges the segment. The new value of RTT calculated by the server 9 is therefore slightly greater than 12.5 seconds and the RTO is not increased excessively. In the present example, time savings of the order of approximately 25 seconds to almost 90 seconds can be expected in respect of the retransmission delay in the event of a subsequent loss of data.

The invention claimed is:

1. A method of controlling data transmission from a remote unit to a radio terminal via a cellular radio communication network including a plurality of base stations, a packet control unit capable of communicating with the terminal via at least two of the base stations, and a network sub-system to route data between the remote unit and the packet control unit, wherein at least some of the data transmitted by the remote unit to the terminal are stored temporarily in the packet control unit, the data stored temporarily containing Transmission Control Protocol (TCP) data segments, wherein the remote unit is arranged to receive from the terminal acknowledgments relating to transmitted TCP data segments and to retransmit TCP data segments that have not been acknowledged on expiry of a retransmission time depending on the received acknowledgments, the method comprising:

transmitting data containing TCP data segments from the remote unit to the terminal via a first one of the base stations connected to the packet control unit; and in response to a request for communication transfer to a second one of the base stations connected to the packet control unit, retransmitting a portion of the data stored temporarily in the packet control unit to the terminal via the second base station, wherein the retransmitted portion of the data is less than all the data in the buffer, and encompasses at least one complete TCP data segment.

2. The method according to claim 1, wherein said portion of the data retransmitted to the terminal includes the at least one complete TCP data segment that was previously transmitted via the first base station and has not been acknowledged by the terminal to the remote unit.

3. The method according to claim 1, wherein the communication transfer request is received from the terminal by a switch of the network sub-system and, in response to reception of said request, said switch commands retransmission of said portion of the data by the packet control unit.

4. The method according to claim 1, wherein said retransmission time is increased if acknowledgments are received from the remote unit with an increasing time-delay.

5. The method according to claim 1, wherein the data transmitted between the network sub-system and the terminal include an identifier of said terminal independent of the base station to which the terminal is connected.

6. A packet control unit for a cellular communication network, comprising:

interface to couple to a switch of the cellular network:

means for communicating with a radio terminal via at least first and second base stations, the interface including storage means for storing temporarily data frames carrying Transmission Control Protocol (TCP) data segments from a remote unit, the means for communicating with the terminal including means for transmitting data frames in the form of data blocks in an acknowledged mode, said storage means being arranged to retain each data frame in memory as long as all of the data of the frame has not been acknowledged by the terminal; and retransmission means for, in response to a request for communication transfer from the first base station to the second base station, retransmitting to the terminal via the second base station a portion of the data frames that are stored temporarily and were transmitted via the first base station, wherein the retransmitted portion is less than all the data frames temporally stored in the storage means, but the retransmitted portion has sufficient size to ensure that at least one complete TCP data segment is transmitted to the terminal.

7. The control unit according to claim 6, wherein said portion of the data frames retransmitted to the terminal conveys the at least one complete TCP data segment that has not been acknowledged by the terminal to the remote unit.

8. The control unit according to claim 6, wherein the retransmission means is arranged to retransmit said portion of the data frames stored temporarily in response to a command received from said switch that has received the communication transfer request from the radio terminal.

9. The method of claim 1, wherein transmitting the data containing the TCP data segments comprises transmitting the data containing the TCP data segments originated by the remote unit that includes a TCP layer, wherein the data transmitted to the terminal is to the terminal that includes a TCP layer.

10. The method of claim 1, further comprising:

receiving, from a serving GPRS support node (SGSN) in the network sub-system, a command to retransmit the portion of the data via the second base station, wherein the command is in response to a message from the terminal that the terminal has transferred to the second base station.

11. The method of claim 1, further comprising communicating an acknowledgement of receipt of the at least one complete TCP data segment from the terminal to the remote unit to enable the remote unit to recalculate a TCP retransmit time out parameter for communication of TCP data segments between the remote unit and the terminal, the TCP retransmit time out parameter specifying the retransmission time.

12. The method of claim 11, wherein communicating the acknowledgement of the at least one complete TCP data segment prevents the TCP retransmit time out parameter from increasing further.

13. The method of claim 1, wherein the request for communication transfer is part of cell reselection by the terminal.

14. The control unit of claim 6, wherein the temporarily stored data frames in the storage means carry TCP data segments from the remote unit that includes a TCP layer, and wherein the data frames communicated to the terminal are communicated to the terminal that includes a TCP layer.

15. The control unit of claim 8, wherein the command received from the switch is a command received from a serving GPRS support node (SGSN).

16. The control unit of claim 6, further comprising means for communicating an acknowledgement, originated by the terminal, of receipt of the at least one complete TCP data segment to the remote unit to enable the remote unit to recalculate a TCP retransmit time out parameter for communication of TCP data segments between the remote unit and the terminal.

17. The control unit of claim 16, wherein the acknowledgement of the at least one TCP data segment is communicated to the remote unit to prevent the TCP retransmit time out parameter from increasing further.

18. The control unit of claim 6, wherein the request for communication transfer is part of cell reselection by the terminal.

* * * * *

UNITED STATES PATENT AND TRADEMARK OFFICE
CERTIFICATE OF CORRECTION

PATENT NO. : 7,400,584 B2
APPLICATION NO. : 10/455911
DATED : July 15, 2008
INVENTOR(S) : Stephane Cayla It is certified that error appears in the above-identified patent and that said Letters Patent is hereby corrected as shown below:

Column 10:
Line 7, "temporally" should be --temporarily--.

Signed and Sealed this

Seventh Day of October, 2008

JON W. DUDAS
*Director of the United States Patent and Trademark Office*